United States Patent [19]

Ingram

[11] 4,170,377
[45] Oct. 9, 1979

[54] VELOCITY RESPONSIVE DEFLECTOR BLADE AND PIVOTAL MOUNTING THEREFOR

[75] Inventor: Charles E. Ingram, Warren, Mich.

[73] Assignee: Four Star Corporation, Troy, Mich.

[21] Appl. No.: 884,009

[22] Filed: Mar. 6, 1978

[51] Int. Cl.² .................................................. B62D 37/02
[52] U.S. Cl. .................................... 296/1 S; 105/2 A; 180/313; 296/191
[58] Field of Search ............ 296/191, 1 S; 180/1 FV; 105/2 A

[56] References Cited

U.S. PATENT DOCUMENTS

| | | | |
|---|---|---|---|
| 3,790,206 | 2/1974 | Backowski | 296/1 S |
| 3,815,696 | 6/1974 | Larive et al. | 296/1 S |

*Primary Examiner*—Richard A. Bertsch
*Attorney, Agent, or Firm*—Basile and Weintraub

[57] ABSTRACT

An air deflector blade for vehicles and the like is pivotally movable between a substantially vertical orientation and a substantially horizontal orientation in response to the wind velocity created thereupon. The pivotal mounting enables the blade to rotate between the vertical and horizontal positions.

29 Claims, 7 Drawing Figures

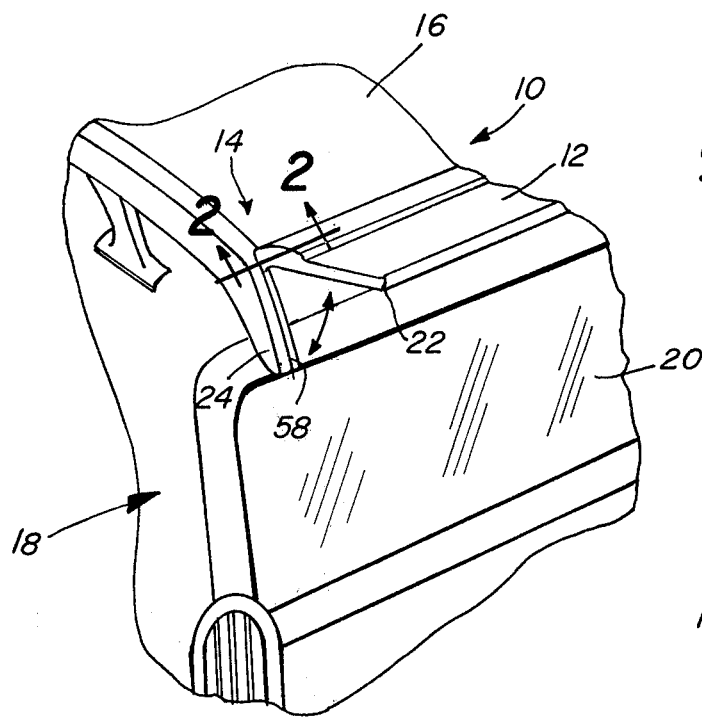
FIG-1
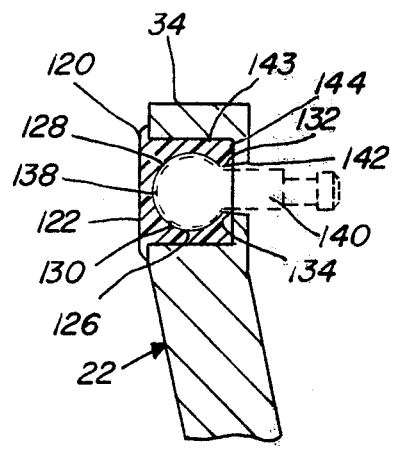
FIG-7
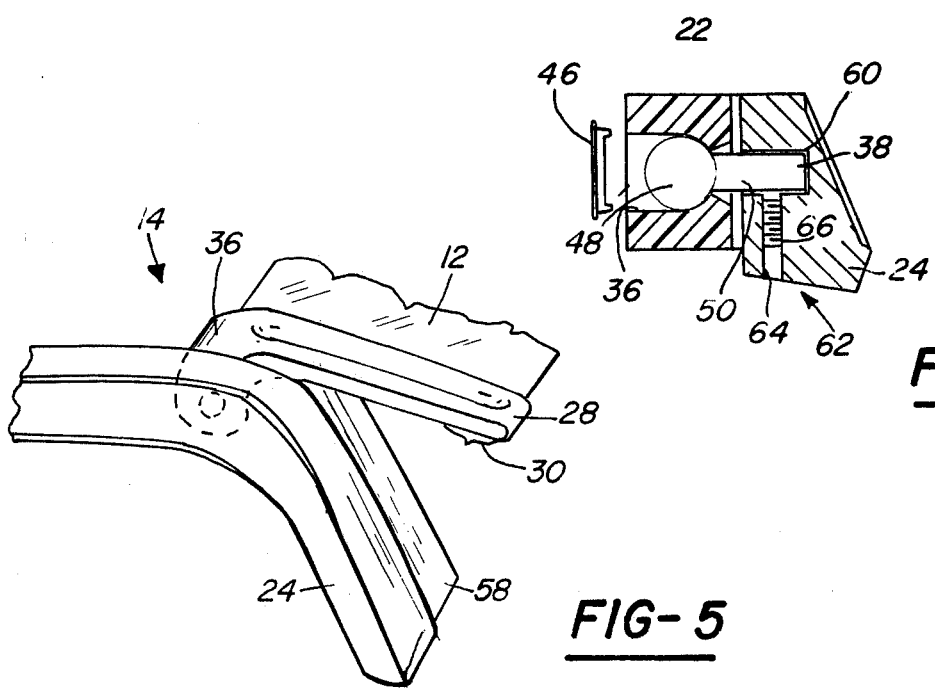
FIG-2
FIG-5

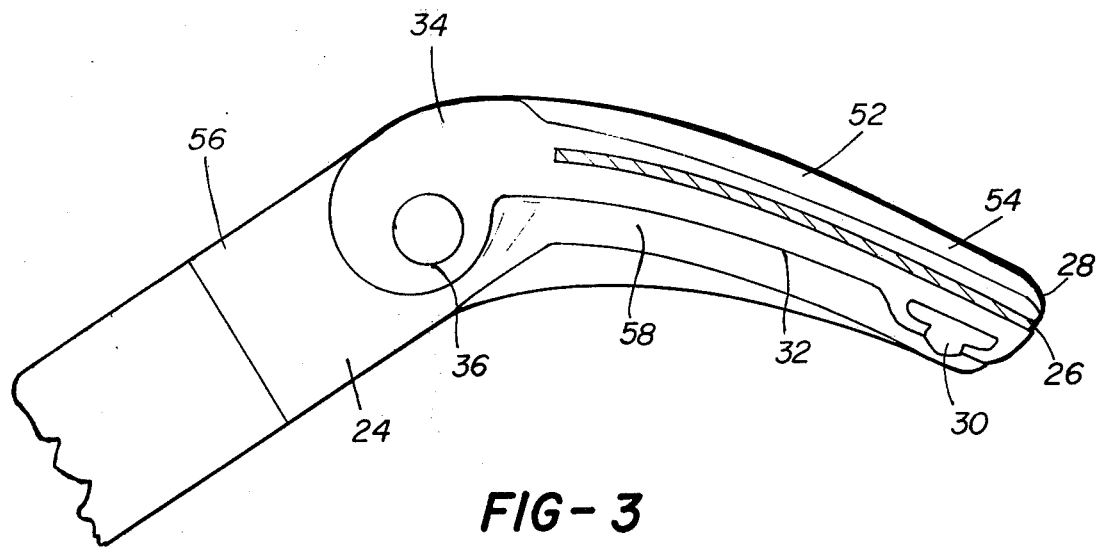
FIG-3
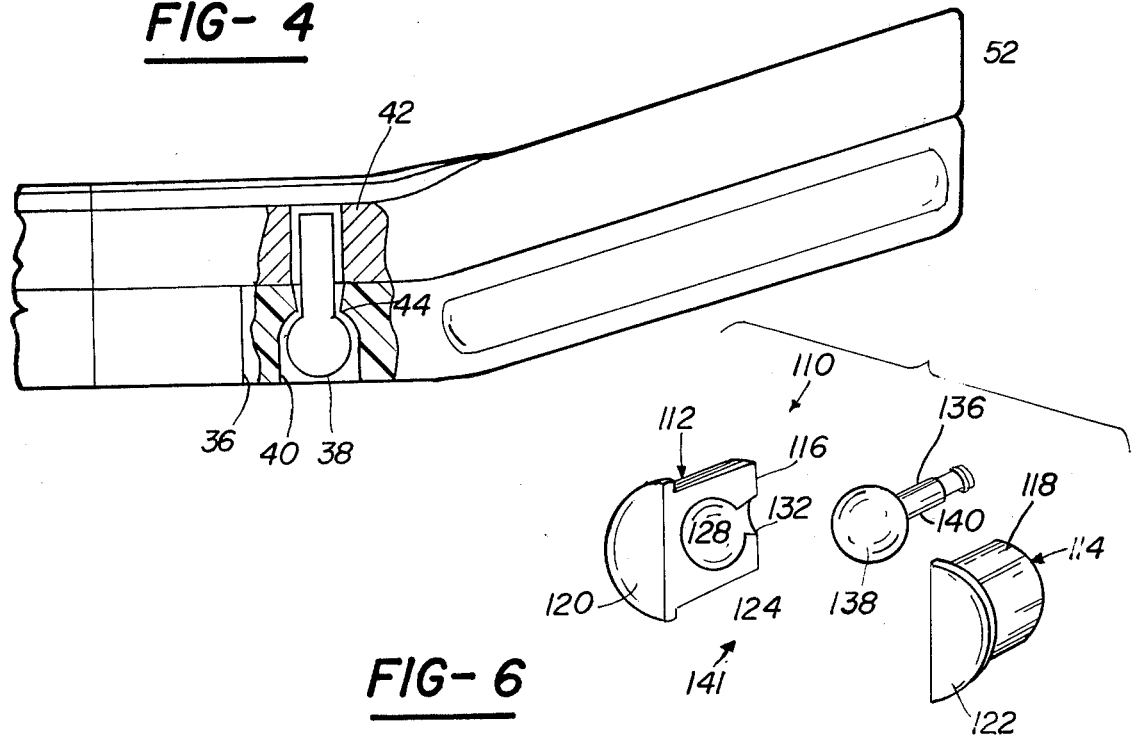
FIG-4
FIG-6

VELOCITY RESPONSIVE DEFLECTOR BLADE AND PIVOTAL MOUNTING THEREFOR

1. Field of the Invention

The present invention pertains to air deflector blades. More particularly, the present invention pertains to vehicle mounted air deflector blades. Even more particularly, the present invention concerns movable air deflector blades.

2. Prior Art

In co-pending U.S. patent application Ser. No. 848,402, filed Nov. 4, 1977, for Velocity Sensitive Air Deflector. There is disclosed therein a vehicle-related air deflector blade which is movable between a vertical and horizontal position. Furthermore, there is disclosed therewithin means for locking the deflector blade in either the horizontal or vertical position. Also, in one of the modes disclosed therewithin the air deflector blade is rendered freely rotatable.

However, it is to be perceived from a review of the disclosure that there is provided little consideration to the mode by which the blade, per se, is pivotally mounted to the end castings.

Furthermore, the disclosure therewithin does not consider the problems of tolerances in mounting the deflector blade to the end castings and the compensation therefor.

The present invention, on the other hand, as will subsequently be detailed, provides an air deflector blade with a pivotal mounting therefor which enables compensation for tolerances as well as providing a new end casting more amenable to the rotational movement of the deflector blade in response to the wind velocity.

STATEMENT OF RELEVANT ART

To the best of applicant's knowledge, the most pertinent art is that found in the aforementioned co-pending United States Patent Application, as well as the patents recited therewithin.

SUMMARY OF THE INVENTION

In accordance with the present invention, there is provided a velocity responsive air deflector blade which rotates between a vertical and horizontal position in response to the velocity of wind passing therepast. The air deflector blade is pivotally mounted to an end casting which, normally, is mounted to the rear roof section of a vehicle.

The deflector blade is a conventional deflector blade having a length substantially equal to the width of a vehicle. The ends of the deflector blade are journalled into slots formed in the mounting assembly hereof.

The mounting assembly hereof comprises first and second members, one being relatively rotatable with respect to the other. A pivotal mounting permits the pivotal rotation of the first member with respect to the second member, the blade, per se, being mounted to the first member.

The assembly hereof further incorporates means for adjustably positioning the pivotal assembly which compensates for misalignment and the like.

For a more complete understanding of the present invention reference is made to the following detailed description and accompanying drawing. In the drawing, like reference characters refer to like parts throughout the several views in which:

BRIEF DESCRIPTION OF THE DRAWING

FIG. 1 is a broken, perspective view of a velocity responsive deflector blade and pivotal mounting therefor in accordance with the present invention;

FIG. 2 is a cross-sectional view taken along line 2—2 of FIG. 1;

FIG. 3 is an end elevational view depicting the pivotal mounting hereof;

FIG. 4 is a top plan view of the pivotal mounting hereof, partly in cross section;

FIG. 5 is a broken perspective view of the pivotal mounting hereof;

FIG. 6 is an exploded, perspective view of an alternate pivotal mounting means used herein, and FIG. 7 is a cross-sectional view of the mounting of FIG. 6 in a deployed mode.

DESCRIPTION OF THE PREFERRED EMBODIMENT

As shown in FIGS. 1-5, accordance with the present invention, there is provided a velocity responsive deflector blade assembly generally indicated at 10. The deflector blade assembly hereof comprises a deflector blade 12 and a mounting therefor, generally, denoted at 14.

At the outset, it is to be noted that the deflector blade 12 is normally mounted onto the roof 16 of a vehicle 18 such that air currents are deflected downwardly across the back light or window 20 of the vehicle.

As is known to those skilled in the art the car which the invention pertains, as the velocity or speed of the increases the deflector blade, which is normally disposed perpendicular to the roof, creates a great drag thereby reducing gasoline mileage and the like.

In accordance with the present invention, the deflector blade hereof is rendered velocity responsive in that as the speed of the car increases thereby increasing the speed of the air flowing and impinging upon the deflector blade the velocity vectors force the deflector blade into a horizontal plane substantially parallel to that of the roof.

Referring again to the drawing, the deflector blade 12, as is known to those skilled in the art, traverses substantially the entire width of the vehicle. Thus, it is to be understood that such is the case herein.

The deflector blade, per se, comprises a light weight member of any suitable configuration which, by its normal weight distribution, orients angularly with respect to the horizontal or roof 16.

The ends of the blade, as above noted, are journalled onto the mounting assembly 14 hereof for pivotal rotation.

The mounting assembly 14 hereof comprises a two-member assembly of first and second members 22, 24, respectively.

The first member or blade cap 22 receives the ends of the blade 12 and is pivotally mounted to the second member or casting 24.

The blade cap is provided with a central elongated slot 26 in which is journalled the end of the blade associated therewith. In this regard, it is to be noted that each end of the deflector blade is similarly mounted to a like mounting assembly. Thus, for purposes of brevity, only one such assembly is described herein.

The blade cap further comprises an elongated section 28 which is substantially coextensive with the slot. The section 28 is an arcuate section or portion which is designed to abut against a reduced section of the casting or second member 24 in a manner to be described subsequently. A cushioning member or means 30 is disposed on the undersurface 32 of the section 28. The cushioning means 30 absorbs the vibratory impulses transmitted to the blade cap upon impact between the casting and the blade cap as the blade cap rotates responsively to the velocity of the air flowing therepast. The cushioning means 30 is formed from any suitable material, such as a hard rubber, sponge or other suitable natural or synthetic material.

The section 28 extends into an enlarged portion or body 34. The body 34 is provided with a transverse opening or bore 36. The throughbore 36 receives a pivot pin 38 or like means therewithin for pivotally mounting the blade cap to the casting 24.

Formed within the bore 36 is a race 40. The race is configured to have an enlarged portion 42 and a reduced section or diameter 44 which cooperate to prevent withdrawal of the pivot pin 38 therefrom.

An end cap 46 is press fitted into the bore to prevent corrosion or the like within the bore 36.

The pivot pin 38 comprises a metallic member or the like having an enlarged head 48 which seats in the enlarged portion 42 of the race 40. The pin has an elongated shaft or shank 50 which extends between the blade cap and the casting to define the pivotal mounting of the first member to the second member. The pivotal means defines a self-aligning assembly by virtue of the orb-configuration of the head 48, which cooperates with the race to overcome angularity, misalignments and the like such that the blade always correctly orientates and freely rotates.

The end casting or member 24, as is known to those skilled in the art, may comprise the terminal end of a cross rail or side rail ordinarily associated with a luggage rack or the like. The castings may be fixedly mounted to the side rail or roof of the vehicle via any suitable mode. The exact form of mounting and association of the casting with the cross rail or side rail does not form part of the present invention, per se.

As shown in the drawing, the casting 24 comprises a main body portion 52 having a first leg 54 and a second leg 56. The legs 54 and 56 are angularly inclined with respect to one another. The casting is, however, an integral and unitary structure.

Extending laterally inwardly from the first leg 54 is a ledge or seat 58. The ledge 58 is formed interally with the first leg of the casting and defines a seat for the blade cap 22. Thus, it is to be appreciated, in this regard that when the cushioning means 30 abuts against the casting, it is abutting against the ledge 58.

Formed in the second leg of the casting is a partial bore 60. The bore 60 is adapted to be in registry with the bore 36 and, thus, the race 40. The pivot pin 38 extends into and seats within the bore 60, as shown. Thus, the pivot pin defines a means for pivotally interconnecting the blade cap and the end casting.

The shank or shaft portion of the pin is locked in the bore 60 in fixed position via locking means generally denoted at 62.

An upwardly extending opening 64 is formed in the second leg 56 of the casting and extends upwardly therefrom into registry with the bore 60. A fastening means 66, such as a threaded set screw or the like, is threadably inserted into the opening 64 and is threadably rotated therewithin until it encounters and meets the shank 50 of the pin 38. Continued further rotation of the fastening means 66 fixes the shank and, thus, the pin 38 in position.

In accordance with the present invention, it is to be appreciated that misalignment and tolerances can be taken up through the fastening means 66 by loosening same and permitting lateral movement of the pivot pin within the bore 60. This compensates for any misalignment and tolerance variations.

It is to be further appreciated that by fixing the shaft within the bore the end cap is then free to rotate about the enlarged portion of the pin 38.

Hence, as the velocity of the air flowing past the deflector blade increases to a certain minimum whereby the downward vector of the mass of the blade is overcome, the blade will rotate about the pivot pin and tend to a horizontal plane, as shown in FIG. 1. When the velocity of the air flowing past the blade decreases, the blade will rotate downwardly. In order to avoid cracking and other deleterious effects, the cushioning means absorbs the forces of impact upon the blade cap encountering the ledge 58.

Referring, now, to FIGS. 6 and 7 there is depicted therein an alternate pivotal mounting means 110. The pivotal mounting means 110 comprises a pair of analogously configured opposed members 112, 114, respectively. Each member 112 or 114 comprises a substantially semi-cylindrical body 116, 118, respectively, and on enlarged semi-circular lip 120, 122, respectively, integrally formed therewith.

Each member is provided with a recess cavity 124, 126 formed in the respective body. Each cavity is configured to have integrally enlarged recess 128, 130, respectively, which communicates with a slotted way 132, 134, respectively.

The two members all adapted to matingly abut in opposed relationship such that a substantially cylindrical housing 141 is formed thereby having a race or groom defined therewithin by the registration of the cavities.

A pivot pin 136 has an enlarged head 138 which seats in the enlarged volume defined by recesses 128 and 130. A shaft 140 integral with the head 138 extends and projects through the guideway defined by slotted ways 132 and 134, as shown.

In deploying this embodiment of the invention the enlarged bore 143 which registers with a reduced diameter bore 142. The interface between the bores defines an annular shoulder or stop 144 for limiting the insertion of the housing 141. With the pivot pin emplaced in the race the housing is disposed within the bore 140. The undersurface of the lips 120, 122 engage the exterior wall of the enlarged body 34 to substitute for the previously referred to cap 46. Thus, this embodiment of the invention is defined by a pivot pin and a race therefor formed within a removable and separable housing.

It is to be appreciated from the preceding that there has been described herein a velocity responsive deflector blade to be freely rotatable between a vertical and horizontal position in response to the velocity of the flowing therepast.

Having, thus, described the invention what is claimed is:

1. A velocity responsive deflector blade assembly, comprising:
   (a) a deflector blade, (b) a mounting assembly for each end of the blade, each assembly comprising:
  (1) a blade cap, the end of the deflector blade being journalled thereonto,
  (2) a casting having means defining a ledge, the blade cap normally seating on the ledge,
  (3) means pivotally mounting the blade cap to the casting, and
  wherein the blade cap pivotally rotates about the pivotal mounting means relative to the casting in response to the velocity of air impinging against the deflector blade, the deflector blade directing a stream of air over a portion of a vehicle when a vehicle is moving at low speeds and pivotally rotating to a position parallel to the stream of air impinging thereagainst when a vehicle is moving at high speeds to minimize the drag created by the deflector blade.

2. The assembly of claim 1 wherein:
the blade cap has a slot formed therein, the end of the blade being journalled into the slot and frictionally retained therewithin.

3. The assembly of claim 1 which further comprises:
cushioning means carried on the blade cap for softening impacts between the blade cap and the ledge.

4. The assembly of claim 1 which further comprises:
means for locking the pivotal mounting means in position.

5. The assembly of claim 1 wherein:
(a) the blade cap has a throughbore formed therein,
(b) the casting has a partial bore formed therein, which is in registry with the blade cap throughbore,
the assembly further comprising: a pivot pin extending between the bores and disposed therewithin and defining the pivotal mounting means.

6. The assembly of claim 5 wherein:
the blade cap throughbore has a race formed therewithin, and
the pivot pin has an enlarged head which seats within the race.

7. A velocity responsive deflector blade assembly for mounting onto a horizontal surface of a vehicle, comprising:
(a) a deflector blade,
(b) means for pivotally and rotatably mounting the deflector blade to the vehicle surface,
(c) means for normally urging the blade to a position normal to the horizontal surface, and
wherein the blade pivotally rotates between the normal position and a position parallel to the horizontal surface in response to the velocity of air impinging against the deflector blade, the deflector blade directing a stream of air over a portion of the vehicle when the vehicle is moving at low speeds and rotating to a position parallel to the horizontal surface when the vehicle is moving at high speeds to minimize the drag created by the deflector blade.

8. The assembly of claim 7 wherein: the mass of the blade defines the means for normally urging.

9. The assembly of claim 7 which further comprises:
means for limiting the movement of the blade toward the normal position.

10. The assembly of claim 9 which further comprises:
a ledge supported by the vehicle surface and extending upwardly therefrom, the blade having at least a portion thereof normally resting thereon, the ledge defining the means for limiting the movement of the blade.

11. The assembly of claim 9 which further comprises:
means for cushioning an impact between the blade and the means for limiting the movement.

12. The assembly of claim 7 which further comprises:
a cap for each end of the blade, the cap having the end of the blade associated therewith journalled thereonto.

13. The assembly of claim 7 which further comprises:
means for locking the pivotal mounting means in position.

14. The assembly of claim 7 wherein:
(a) the blade cap has a throughbore formed therein,
(b) the casting has a partial bore formed therein, which is in registry with the blade cap throughbore,
the assembly further comprising: a pivot pin extending between the bores and disposed therewithin and defining the pivotal mounting means.

15. The assembly of claim 14 wherein:
the blade cap throughbore has a race formed therewithin, and
the pivot pin has an enlarged head which seats within the race.

16. The assembly of claim 7 which further comprises:
a casting affixed to the vehicle surface, the means for pivotally and rotatably mounting being associated with the casting.

17. The assembly of claim 16 which further comprises:
a pair of spaced apart castings, each casting being associated with one end of the deflector blade.

18. The assembly of claim 16 which further comprises:
means for limiting the movement of the blade toward the normal position.

19. The assembly of claim 18 which further comprises:
means for cushioning an impact between the deflector blade and the means for limiting the movement.

20. The assembly of claim 18 which further comprises:
a ledge integrally formed with the casting, the blade normally having a portion thereof seating on the ledge, the ledge defining the means for limiting the movement of the blade.

21. The assembly of claim 16 which further comprises:
a cap for each end of the blade, the cap having the end of the blade journalled thereonto, the casting being associated with one end of the blade.

22. The assembly of claim 21 wherein:
(a) the blade cap has a throughbore formed therein.
(b) the casting has a partial bore formed therein, which is in registry with the blade cap throughbore,
the assembly further comprising: a pivot pin extending between the bores and disposed therewithin and defining the pivotal mounting means.

23. The assembly of claim 21 wherein:
the blade cap throughbore has a race formed therewithin, and
the pivot pin has an enlarged head which seats within the race.

24. The assembly of claim 22 which further comprises:
means for locking the pivot pin in position.

25. The assembly of claim 24 wherein:
(a) the casting has a bore formed transverse to the partial bore and opening into communication therewith, and
(b) the assembly further comprising a fastening means insertable from the transverse bore and into the partial bore, the fastening means engaging the pivot pin to lock the pivot pin in position, the transverse bore cooperating with the set screw to define the pivot pin locking means.

26. The assembly of claim 24 which further comprises:
means for aligning the blade in position.

27. The assembly of claim 26 wherein the means for locking the pivot pin defines the means for aligning the blade.

28. The assembly of claim 27 wherein:
(a) the casting has a bore formed transverse to the partial bore and opening into communication therewith, and
(b) the assembly further comprising a fastening means insertable through the transverse bore into the partial bore to engage the pivot pin to lock the pivot pin in position, the fastening means cooperating with the transverse bore to define the means for locking and aligning.

29. The assembly of claim 23 which further comprises:
a pair of opposed, semi-cylindrical bodies, each body having a cavity formed therewithin, each cavity having an enlarged recess and a way in communication therewith, the bodies matingly abutting in opposed relationship to define a substantially cylindrical housing, the cavities of the bodies registering to define the race, and
wherein the bodies are insertable into the bore of the blade cap.

* * * * *